(12) United States Patent
Inoue

(10) Patent No.: US 9,895,911 B2
(45) Date of Patent: Feb. 20, 2018

(54) IMAGE FORMING APPARATUS

(71) Applicant: Sharp Kabushiki Kaisha, Sakai, Osaka (JP)

(72) Inventor: Kiyoshi Inoue, Sakai (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 15/355,086

(22) Filed: Nov. 18, 2016

(65) Prior Publication Data

US 2017/0066263 A1 Mar. 9, 2017

Related U.S. Application Data

(63) Continuation of application No. 13/087,482, filed on Apr. 15, 2011, now Pat. No. 9,535,383.

(30) Foreign Application Priority Data

Apr. 19, 2010 (JP) ................... 2010-095657

(51) Int. Cl.
B41J 13/00 (2006.01)
G06F 3/12 (2006.01)
G03G 15/36 (2006.01)
H04N 1/387 (2006.01)
H04N 1/00 (2006.01)
G03G 15/00 (2006.01)

(52) U.S. Cl.
CPC .......... *B41J 13/0009* (2013.01); *G03G 15/36* (2013.01); *G03G 15/50* (2013.01); *G03G 15/502* (2013.01); *G06F 3/1218* (2013.01); *G06F 3/1219* (2013.01); *H04N 1/00002* (2013.01); *H04N 1/00015* (2013.01); *H04N 1/00031* (2013.01); *H04N 1/00053* (2013.01); *H04N 1/00063* (2013.01); *H04N 1/3873* (2013.01); *G03G 2215/00569* (2013.01); *G03G 2215/00582* (2013.01); *H04N 2201/0094* (2013.01)

(58) Field of Classification Search
CPC ............................ G06F 3/1219; G06F 3/1218
See application file for complete search history.

(56) References Cited

U.S. PATENT DOCUMENTS

2006/0133844 A1* 6/2006 Konno ................. B41J 3/60
399/82
2007/0109349 A1* 5/2007 Tanaka .................. B41J 11/008
347/37

(Continued)

OTHER PUBLICATIONS

Inoue, "Image Forming Apparatus", U.S. Appl. No. 13/087,482, filed Apr. 15, 2011.

*Primary Examiner* — Shelby Fidler
(74) *Attorney, Agent, or Firm* — Keating & Bennett, LLP

(57) ABSTRACT

When trial printing is executed in a repeat printing mode, trial printing is performed in size of an image of one piece in a layout in which a plurality of images are supposed to be printed in the repeat printing mode normally. A user who has checked a finished state of the trial printing sets, when the finished state is in a desired state, the recording paper on which the trial printing is performed to the paper feed portion again and executes the repeat printing. Thereby, in a blank space excluding a print image which is printed with a first time trial printing, a scheduled quantity of a plurality of images are repeatedly printed.

6 Claims, 8 Drawing Sheets

(56) References Cited

U.S. PATENT DOCUMENTS

| | | | |
|---|---|---|---|
| 2008/0130037 A1* | 6/2008 | Tamayo | G06K 15/02 358/1.15 |
| 2009/0027711 A1* | 1/2009 | Mizutani | H04N 1/00347 358/1.13 |

* cited by examiner

IMAGE FORMING APPARATUS

CROSS-NOTING PARAGRAPH

This non-provisional application claims priority under 35 U.S.C. § 119 (a) on Patent Application No. 2010-095657 filed in JAPAN on Apr. 19, 2010, the entire contents of which are hereby incorporated herein by reference.

FIELD OF THE INVENTION

The present invention relates to an image forming apparatus, and more specifically, to an image forming apparatus provided with a repeat printing function which forms images by repeatedly arranging image data on one sheet of recording paper and a trial printing function which when forming a single piece of image data into a plurality of images, forms the single piece of image data into an image, first, and subsequently, forms a scheduled quantity of images when an image formation instruction is input.

BACKGROUND OF THE INVENTION

Image forming apparatuses are known, provided with such a function as a copying function which forms an image of a document image read by a scanner or a printer function for forming an image of (printing) image data input from an external device such as a PC on a medium such as recording paper. Some image forming apparatuses are provided with a repeat printing function which forms images by repeatedly arranging image data on one sheet of recording paper and a trial printing function which, when forming a single piece of image data into a plurality of images, forms the single piece of image data into an image, first, and subsequently, forms a scheduled quantity of images when an image formation instruction is input.

Concerning the repeat printing function as described above, for example, Japanese Laid-Open Patent Publication No. 2008-142969 discloses, an arranging method of document images which arranges identical document images effectively on a sheet of paper to be output so as to eliminate a wasteful blank in a function for continuously copying a plurality of document images on the paper.

If users try to check a finished state of the printing with use of the trial printing function as described above, when they perform printing with use of the repeat printing function, the conventional function user one sheet of a recording paper for the trial printing, and therefore, printing is performed all over the recording paper. In this case, since the repeat printing function is set, a plurality of the same images are repeatedly printed on one sheet of the recording paper. Then, in a case where the finish of the printing of the first sheet of the recording paper is not in a state desired by a user and printing is performed again with print conditions changed, the first sheet of the recording paper on which the plurality of images are repeatedly printed is discarded.

In the case of performing the trial printing using the repeat printing function, it is sufficient if a finished state of one image is checked among the plurality of images to be printed repeatedly by the repeat printing. However, such a function is not provided in the conventional function, and even though the trial printing is executed, a plurality of the same images are repeatedly printed on the recording paper, and therefore, sometimes all those printed images go to waste.

According to the arranging method of a document image described in Japanese Laid-Open Patent Publication No. 2008-142969, although its possible to arrange the same images on one sheet of paper efficiently without waste, in this case also, the user is not able to judge whether or not printing is performed in a desired state until the user actually sees a printing result. Then, when the printing result is not in a state desired by the user and the printing is to be performed again, a plurality of the printed images are all useless.

SUMMARY OF THE INVENTION

An object of the present invention is to provide an image forming apparatus having a repeat printing function for forming images by arranging a plurality of image data to be printed on one sheet of recording paper, in which at a stage of printing only one image on one sheet of recording paper, a user checks a finished state thereof, and a scheduled quantity of repeat printings is performed so that recording paper, a toner and the like that are used for printing are saved, thus enabling realization of the resource saving.

Another object of the present invention is to provide an image forming apparatus having an image forming portion which forms an image of image data on recording paper and a paper feed portion which feeds the recording paper to the image forming portion, comprising a repeat printing function which forms images by repeatedly arranging image data on one sheet of recording paper, and a trial printing function which, when forming a plurality of images for one of image data, forms only one image for the image data first, and subsequently, forms an image again in response to input of an image formation instruction, wherein the image forming portion enables execution of the trial printing function in a mode of executing the repeat printing function, and in forming an image by the trial printing function, forms only one image on a part of recording paper for image data to be printed by means of repeat printing, and in response to input of an instruction to execute printing by the repeat printing function, feeds the recording paper on which an image is formed by the trial printing function again by the paper feed portion and forms a scheduled quantity of images by the repeat printing function in a blank space on the fed recording paper.

Another object of the present invention is to provide the image forming apparatus, wherein the image forming portion enables repetitive execution of forming an image more than once by the trial printing function, and when forming an image by the trial printing function, forms a next image by the trial printing function at a position of a blank on the recording paper excluding a position of an image formed by the trial printing function in the past.

Another object of the present invention is to provide the image forming apparatus, wherein the image forming portion forms the scheduled quantity of images by the repeat printing function at a position of a blank on the recording paper excluding a position of an image formed by the tri al printing function, when forming a scheduled quantity of images by the repeat printing function after forming an image is repeated more than once by the trial printing function.

Another object of the present invention is to provide the image forming apparatus, wherein the image forming portion attaches, to the image excluding the image of conditions used for forming images by the repeat printing function among the plurality of images formed by the trial printing function, an indication for clearly showing that the image is not used for the repeat printing, when forming a scheduled quantity of images by the repeat printing function after forming an image is repeated more than once by the trial printing function.

Another object of the present invention is to provide the image forming apparatus, wherein the image forming portion stores print conditions of the plurality of images formed by the trial printing function performed more than once, allows an user to select an image to be used in forming an image by the repeat printing function among the plurality of images, and forms a scheduled quantity of images by the repeat printing function with use of the print conditions corresponding to the selected image.

Another object of the present invention is to provide the image forming apparatus, wherein the image forming portion attaches, to a predetermined position of the recording paper, an indication showing a setting direction of the recording paper to the paper feed portion again, when forming an image by the trial printing function.

PREFERRED EMBODIMENTS OF THE INVENTION

Figure 1:
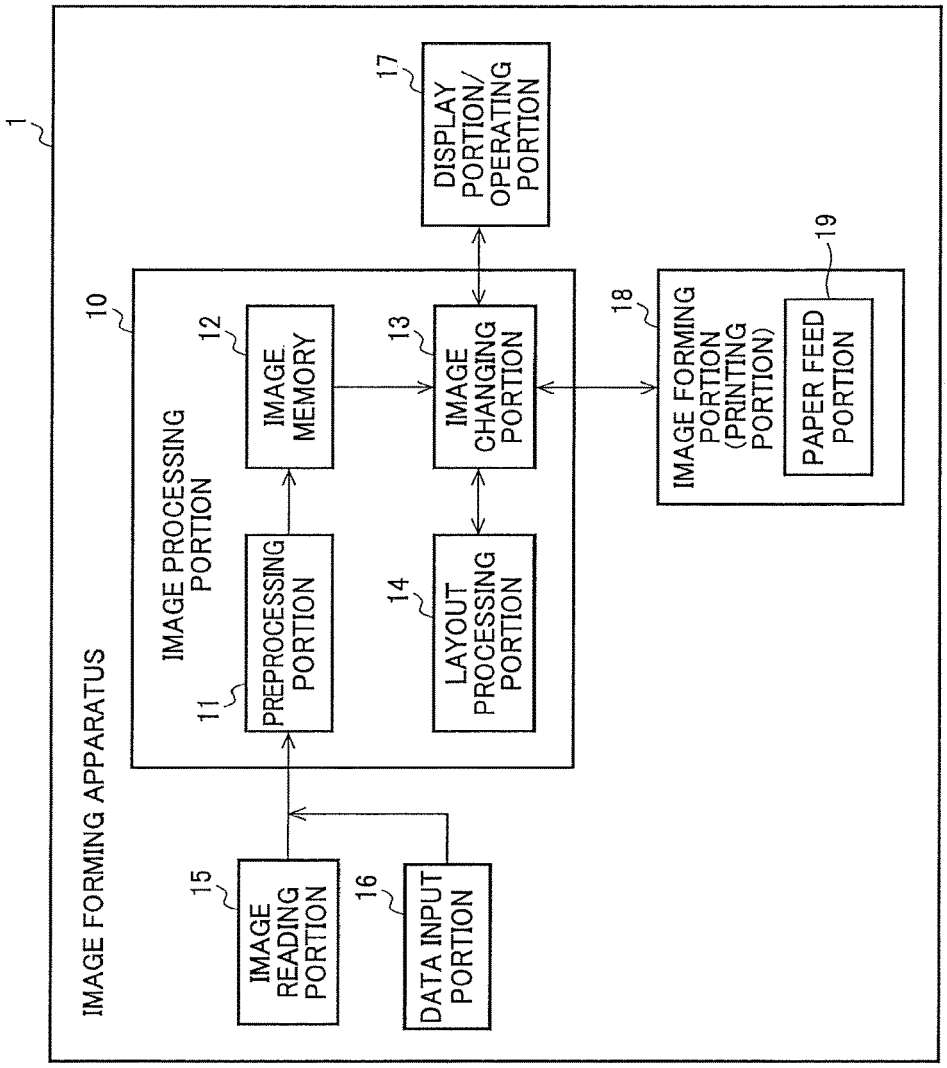
FIG. 1 is a block diagram for explaining a configuration example of an image forming apparatus according to the present invention.

FIG. 1 is a block diagram for explaining a configuration example of an image forming apparatus according to the present invention. The image forming apparatus 1 of the present example is configured as a multi-functional peripheral provided with a copying function to read a document image and form an image of (print) the read document image on a medium such as recording paper, and a printer function to form an image of image data input from an external device such as a PC (personal computer). The image forming apparatus 1 is provided with an image processing portion 10, an image reading portion 15, a data input portion 16, a display portion/operating portion 17 and an image forming portion (printing portion) 18.

The image reading portion 15 reads an image of a document placed on a document platen of the image forming apparatus 1 (not-shown) to output to the image processing portion 10 as image data. Further, the data input portion 16 connects to an external device such as a PC, inputs image data transmitted from the external device and outputs the image data to the image processing portion 10. The external device is not limited to a device such as a PC, and may be a memory, a storage device or the like attached to the image forming apparatus 1.

The display portion/operating portion 17 has a display portion for displaying an image such as menus for operating the image forming apparatus 1 and various information, and an operating portion for receiving input that is given by a user in response to the display of the display portion. For the display portion/operating portion 17, for example, a touch panel may be used. The user is able to perform input operation for instructing repeat printing or trial printing by using the display portion/operating portion 17. The user is also able to input an instruction to change a print image at the time of repeat printing.

The image processing portion 10 includes a preprocessing portion 11 which performs preprocessing for printing to the image data output from the image reading portion 15 or the data input portion 16, an image memory 12 which temporarily stores the preprocessed image data, an image changing portion 13 which changes the image data temporarily stored in the image memory 12, and a layout processing portion 14 which sets or changes an output layout of the image data.

The above-described image changing portion 13 performs change of size (enlargement, reduction) of an image instructed by the display portion/operating portion 17 and processing for changing a condition of color (contrast, tone, etc.). The image changing portion 13 has a function which stores history of print conditions changed by a trial printing function.

When repeat printing is instructed from a user by operating the display portion/operating portion 17, the above-described layout processing portion 14 performs layout processing for recording paper of image data to be printed. The trial printing function stores the number of times trial printing has been performed and determines a position on which a next image is printed.

The image forming portion 18 forms an image of (prints) image data output from the image changing portion 13 on recording paper. For a method for forming an image, the known electrophotography or an inkjet method may be employed as appropriate. The image forming portion 18 is provided with a paper feed portion 19 that feeds recording paper on which an image is formed. The paper feed portion 19 is able to execute the subsequent trial printing or repeat printing by setting the recording paper on which the trial printing is performed again.

Figure 2A:
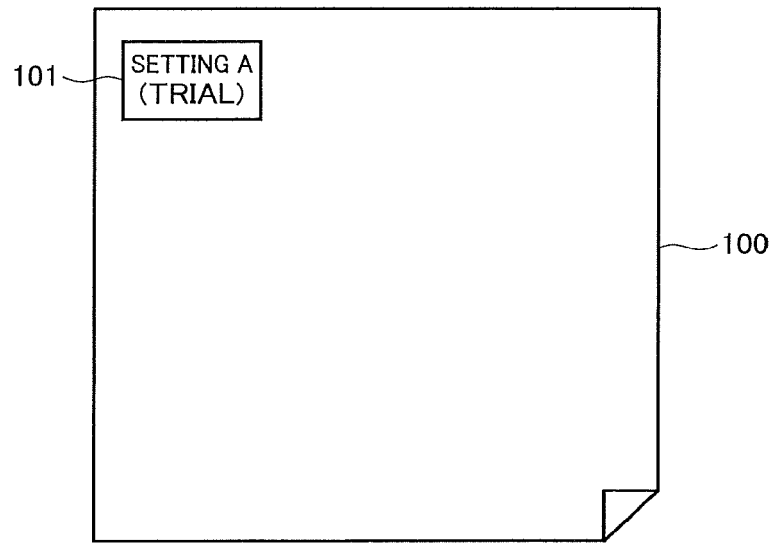
FIGS. 2A and 2B are diagrams for explaining a processing example of trial printing executed by the image forming apparatus of the present invention.
Figure 2B:
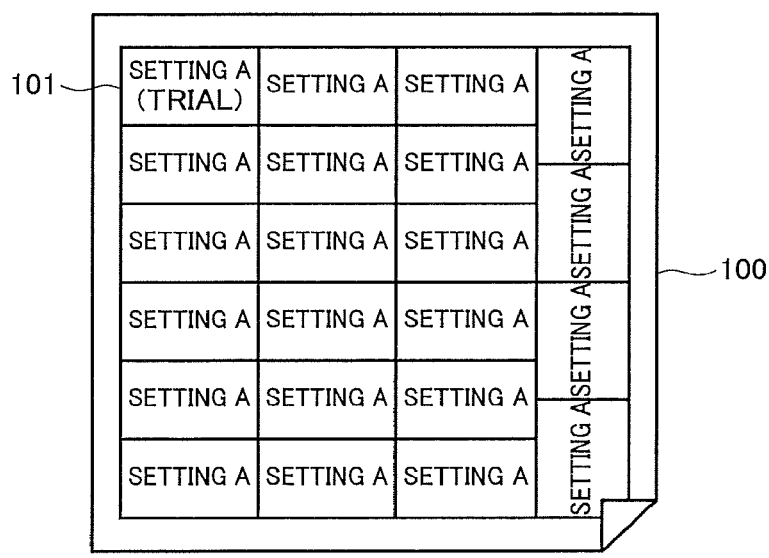

Next, a processing example of trial printing executed in the image forming apparatus of the present invention will be described with reference to FIGS. 2A and 2B. As described above, the trial printing is a function which forms a scheduled quantity of image by giving an instruction to form an image again, after the image data is formed into one image regardless the set value of the scheduled quantity and a user checks its finish state when forming a single piece of image date a into a plurality of images. Additionally, the repeat printing is a function in which images are formed by repeatedly arranging a plurality of images on one sheet of recording paper.

In the case of executing the trial printing, first, a user sets a mode for performing repeat printing in the image forming apparatus 1, and selects recording paper on which image data is printed. Selection of recording paper indicates, for example, selection of recoding paper size such as A4, B5 and the like. A document is then set on a document platen the image reading portion 15 reads a document image and then to obtain image data of the document. Alternatively, the image data may be input from the external device to the data input portion 16.

The trial printing is then executed. Thereby, it is possible to print only one image formed from the image data on a part of the selected recording paper. FIG. 2A is a diagram showing a state of printing on the recording paper 100 at this time. As shown in FIG. 2A, when trial printing is executed in a repeat printing mode, the trial printing is performed in size of one image in a layout in which a plurality of images are supposed to be printed in the repeat printing mode normally. Thereby, at the time of trial printing in the repeat printing mode, printing with use of one entire sheet of recording paper is not performed, thus realizing resource saving.

The user who has checked a finish of the trial printing sets the recording paper 100 on which the trial printing is performed to the paper feed portion 19 again when the finished state is in a desired state and performs the operations for executing the repeat printing. As shown in FIG. 2B, thereby, a scheduled quantity of a plurality of images are repeatedly printed on a blank space excluding the print image 101 which is printed in the first time trial printing. The print conditions at this time are the print conditions in accordance with a setting A of the first time trial printing. Moreover, in the repeat printing at this time, a layout of print images is performed so as to make a wasteful blank as little as possible according to the size of the recording paper 100 selected by the user.

Furthermore, in a case where the print image 101 obtained by the first time trial printing is not in a state desired by a user, the user arbitrarily change the setting of the print conditions, and sets the recording paper 100 on which the trial printing is performed to the paper feed portion 19 again so as to be able to perform an operation for executing the trial printing again. In second time trial printing, printing under new print conditions is performed adjacent to the print image 101 for which the first time trial printing is performed. Note that, the print images in the first time and the second time are not necessarily adjacent to each other, however, the second time trial printing is, at least, performed on a blank space other than the first time trial printing.

When the second time trial printing is in a state desired by a user, in the same manner as described above, the recording paper 100 is set to the paper feed portion 19 again and the repeat printing is executed, so that images based on the setting of second time print conditions are able to be arranged and printed on a blank space.

In this way, the image to be printed by performing trial printing once is set to be only one and repeat printing is performed with use of a blank space of the recording paper on which the trial printing is performed, thus wasteful printing is able to be suppressed to minimum. Moreover, the print image in trial printing is also able to be used, and when the trial printing is performed only once, the same result as that of normal repeat printing is able to be obtained so as to realize the resource saving.

Figure 3A:
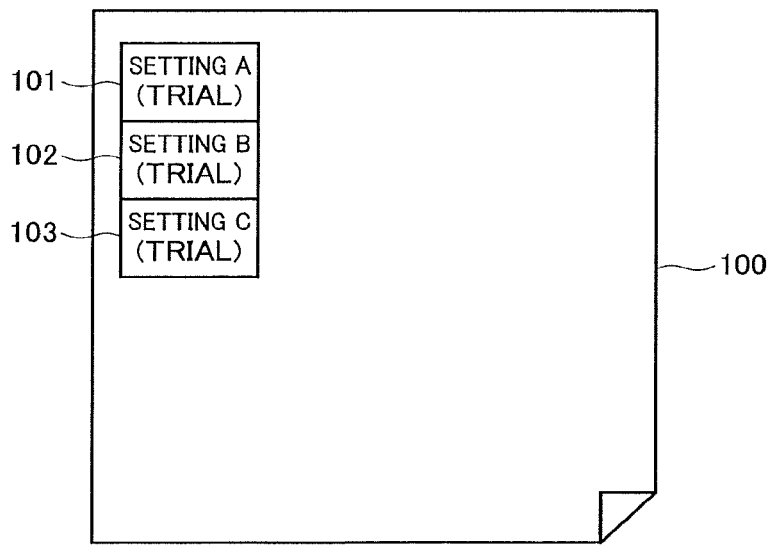
FIGS. 3A and 3B are diagrams for explaining a state where the trial printing is performed three times in a repeat printing mode.
Figure 3B:
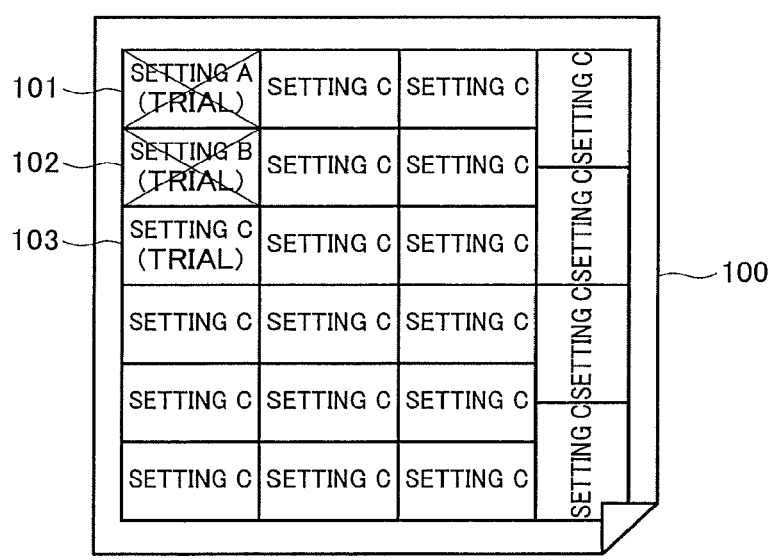

The trial printing is also performed at third time and thereafter further repeatedly, and the same processing is performed. This enables the user to perform confirmation by the trial printing until the user is fully satisfied with the finished state. FIGS. 3A and 3B are diagrams for explaining a state when trial printing is performed three times in the repeat printing mode. As shown in FIG. 3A, the user is not satisfied even with the trial printing twice, and when third time trial printing is further executed with a setting (setting C) under different print conditions, three print images 101 to 103 of the trial printing are arranged in line. Note that, even at the third time and thereafter, the print images by the trial printing are not necessarily adjacent to each other, and at least, a next trial printing image is printed so as not to overlap the print images of previous trial printing.

For example, when the user is satisfied with the print image 103 of third time trial printing, the user sets the recording paper 100 again to the paper feed portion 19 to execute the repeat printing. FIG. 3B shows a finished state of the repeat printing. At this time, for the print images 101 and 102 of the trial printing in the first time and the second time which are not used in the repeat printing, indications are added for showing that those are not employed as the images for the repeat printing.

For example, as shown in FIG. 3B, "x" marks are added on the trial print images 101 and 102 in the first time and the second time so as to clearly indicate that those are the images for which repeat printing is not performed. The indication showing that one is not employed for repeat printing is not limited to the "x" marks as described above, and may be set as appropriate by means of marking diagonal lines and the like. This enables the user to distinguish the trial print images that are not employed, and even in a case of using the recording paper 100 in a manner of cutting out and dividing in terms of an image, prevent unnecessary print images and necessary print images from being mixed.

Figure 4:
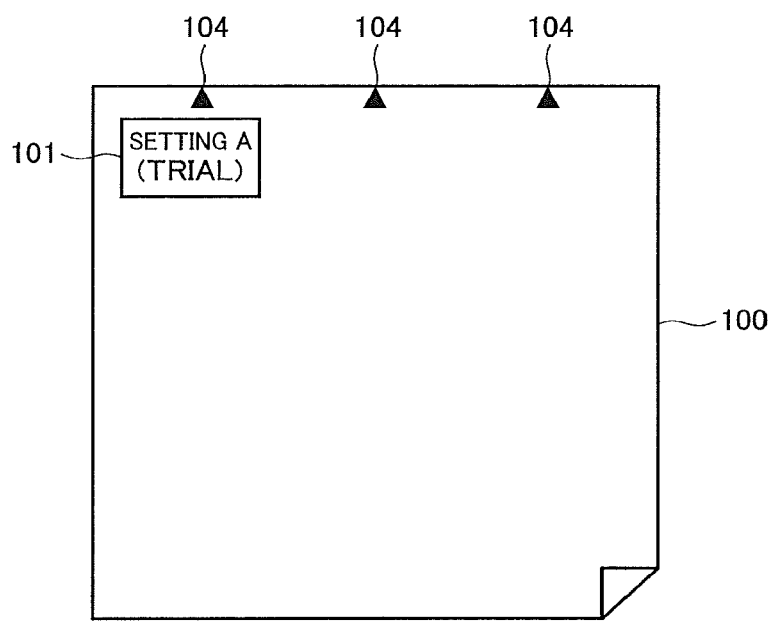
FIG. 4 is a diagram for explaining an example in which a set direction of recording paper is displayed in performing a second time trial printing and thereafter.

FIG. 4 is a diagram for explaining an example in which a set direction of the recording paper is displayed in second time trial printing and thereafter. As described above, in the embodiment according to the present invention, in the repeat printing mode, it is possible to execute a plurality of times of trial printing with use of one sheet of the recording paper. At the time, a set direction of the recording paper 100 with respect to the paper feed portion 19 is able to be clearly indicated on the recording paper 100 in the second time trial printing and thereafter.

For example, as shown in FIG. 4, when first time trial printing is executed, trial printing is performed for a document image in the setting A, as well as indications 104 for showing a set direction in feeding paper again are printed on the recording paper 100. In this example, triangular marks are printed on an upper part of the recording paper 100 as the indications 104 for showing the set direction to make it clear that a feed direction next time is an upper direction. The indications 104 are not limited to the triangular marks, and may be set as appropriate by using arrows and the like. Moreover, a location of indication is also not limited to the upper part of the recording paper 100, and is preferably set on edge portions of the recording paper 100 so as not to disturb the image printing, at least.

In this manner, the indications 104 as described above are performed on the recording paper 100 in performing trial printing so that even in the case where the recording paper 100 is fed again to perform the trial printing again, or the repeat printing is performed, the user is able to discriminate the feed direction of the recording paper 100 easily and perform the printing without an error or waste.

Figure 5A:
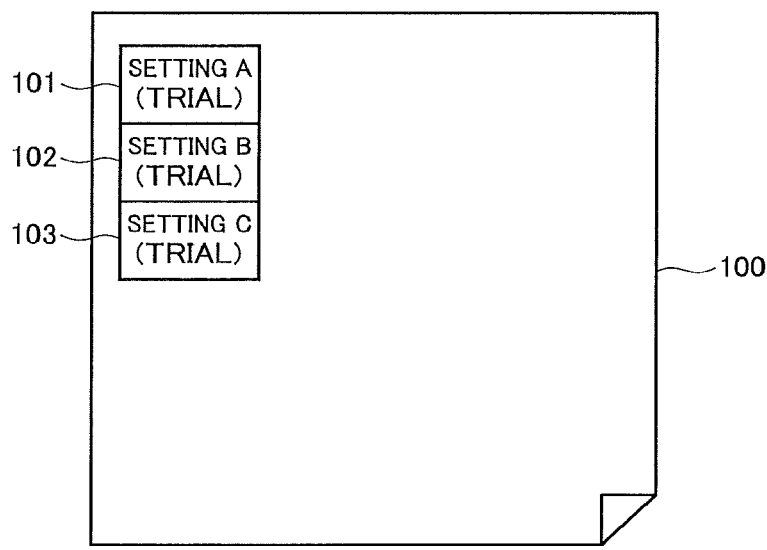
FIGS. 5A and 5B are diagrams for explaining processing in using a past setting at the time of trial printing.
Figure 5B:
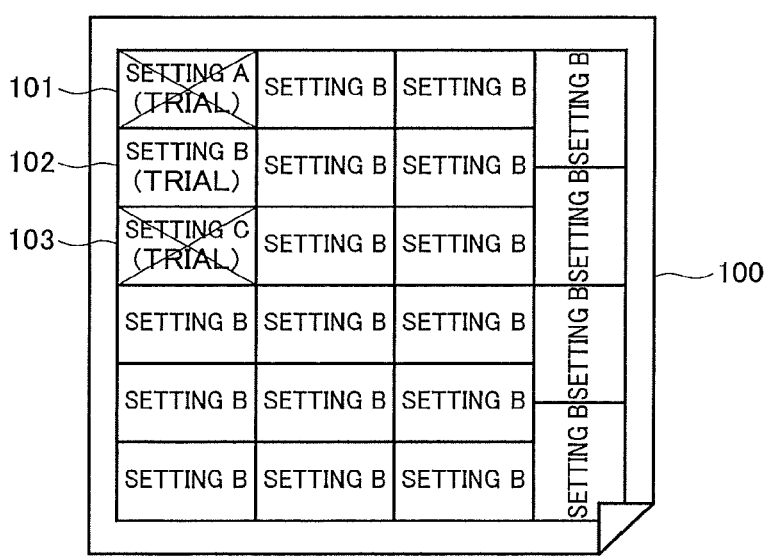

FIGS. 5A and 5B are diagrams for explaining processing in which a past setting in trial printing is used. At the time of executing the trial printing in the repeat printing mode as described above, when trial printing is performed on the same recording paper 100 more than once, not only print conditions of the most recent trial printing but also print conditions of the trial printing executed in the past may be used to execute the repeat printing.

For example, as shown in FIG. 5A, when trial printing is executed three times with settings A to C of the print conditions, print images 101 to 103 of the trial printing under the three print conditions are printed on the recording paper 100. Here, when the user wishes to perform repeat printing with use of the print conditions of the second time trial printing, instead of those of the final trial printing, the second trial printing is selected with a predetermined operation so that repeat printing is able to be executed under print conditions thereof (setting B).

FIG. 5B shows a finished state of repeat printing at this time. In this case, the print conditions used in the repeat printing are the print conditions in the second time trial printing (setting B), and therefore, for the print images 101 and 103 of the first time trial printing (setting A) and the third time trial printing (setting C), "x" marks are printed showing that those are the images for which repeat printing is not performed. Thereby the user is able to easily recognize that repeat printing is performed with use of the print conditions of the second time trial printing.

Figure 6:
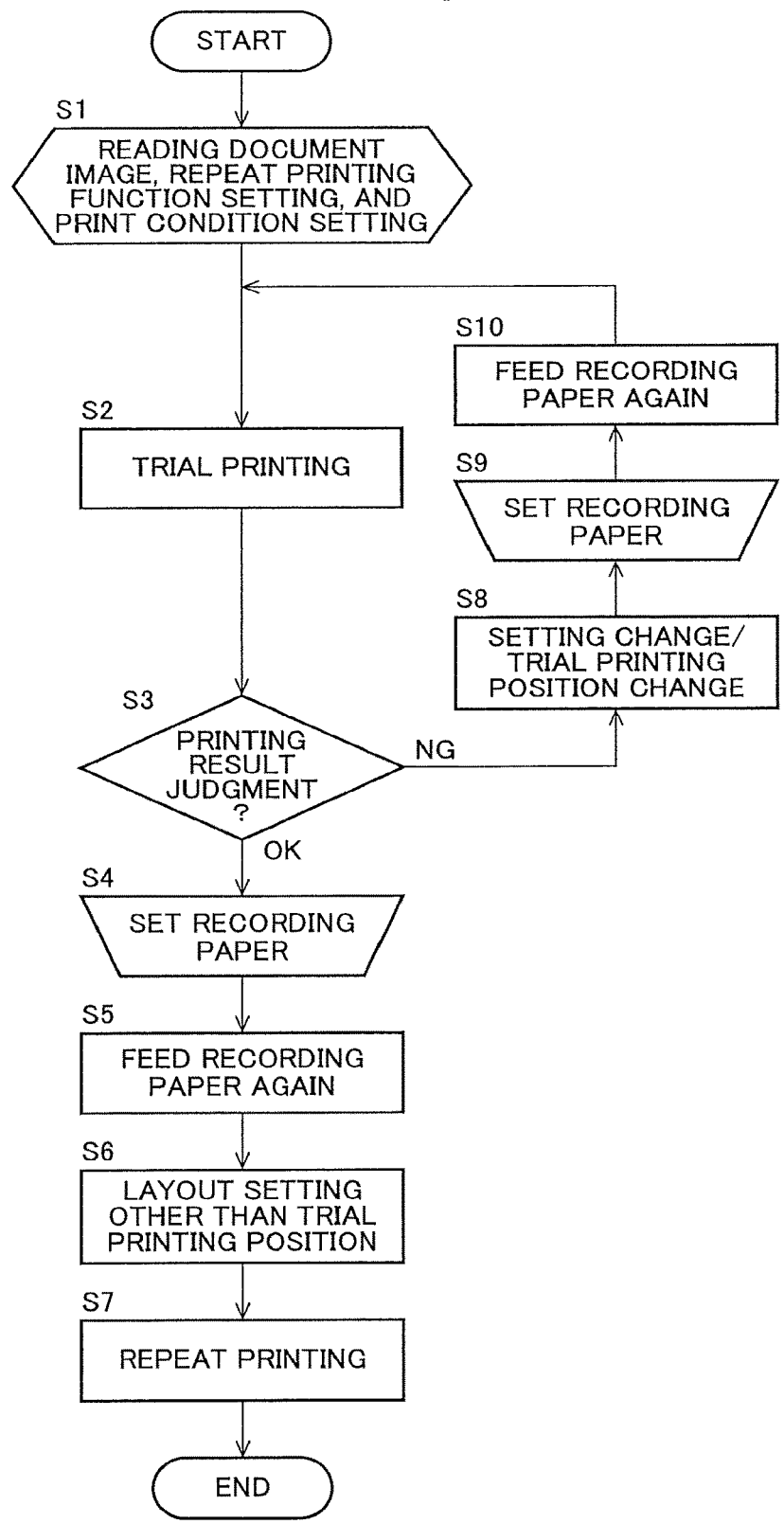
FIG. 6 is a flowchart for explaining an example of processing for repeat printing in the image forming apparatus of the present invention.

FIG. 6 is a flowchart for explaining an example of processing for repeat printing in the image forming apparatus of the present invention. In performing repeat printing in the image forming apparatus, first, reading of a document image, setting to a repeat printing mode, and setting of print conditions are performed (step S1). The print conditions include size of recording paper, conditions such as contrast or tone of the print image, conditions of enlargement or reduction, and the like. In a case of using default print conditions, setting of print conditions may be omitted. Additionally, reading of a document image is able to be performed by using the image reading portion 15 or by means of input processing from an external device.

Then, trial printing is executed by a predetermined operation by a user (step S2). Thereby image data is printed on a part of recording paper with trial printing. The user judges a printing result of the trial printing (step S3), and when judged as OK, the recording paper is set again to the paper feed portion (step S4). At this time, when there is an indication printed for showing a set direction of feeding paper, the recording paper is able to be set in accordance with the direction.

Then, the image forming apparatus feeds the recording paper again in accordance with the predetermined operation of the user (step S5), sets a layout in which a plurality of identical images are arranged on a blank space excluding the print image printed with the trial printing (step S6), and executes repeat printing in accordance with the layout (step S7).

On the other hand, when the user judges that the result of the trial printing is NG at step S3, the setting of the print conditions is changed in accordance with the user operation. At this time, position conditions on recording paper on which next trial printing is performed are also changed (step S8). Then, the user sets the recording paper on which the trial printing is performed again to the paper feed portion (step S9). The image forming apparatus feeds the recording paper again in accordance with a predetermined operation by the user (step S10), and executes trial printing again (step S2). The trial printing is allowed to be executed repeatedly until the user is satisfied therewith. Here, in accordance with the size of the recording paper, the layout of the trial printing and the like, an upper limit of the number of times of performing trial printing may be determined.

Figure 7:
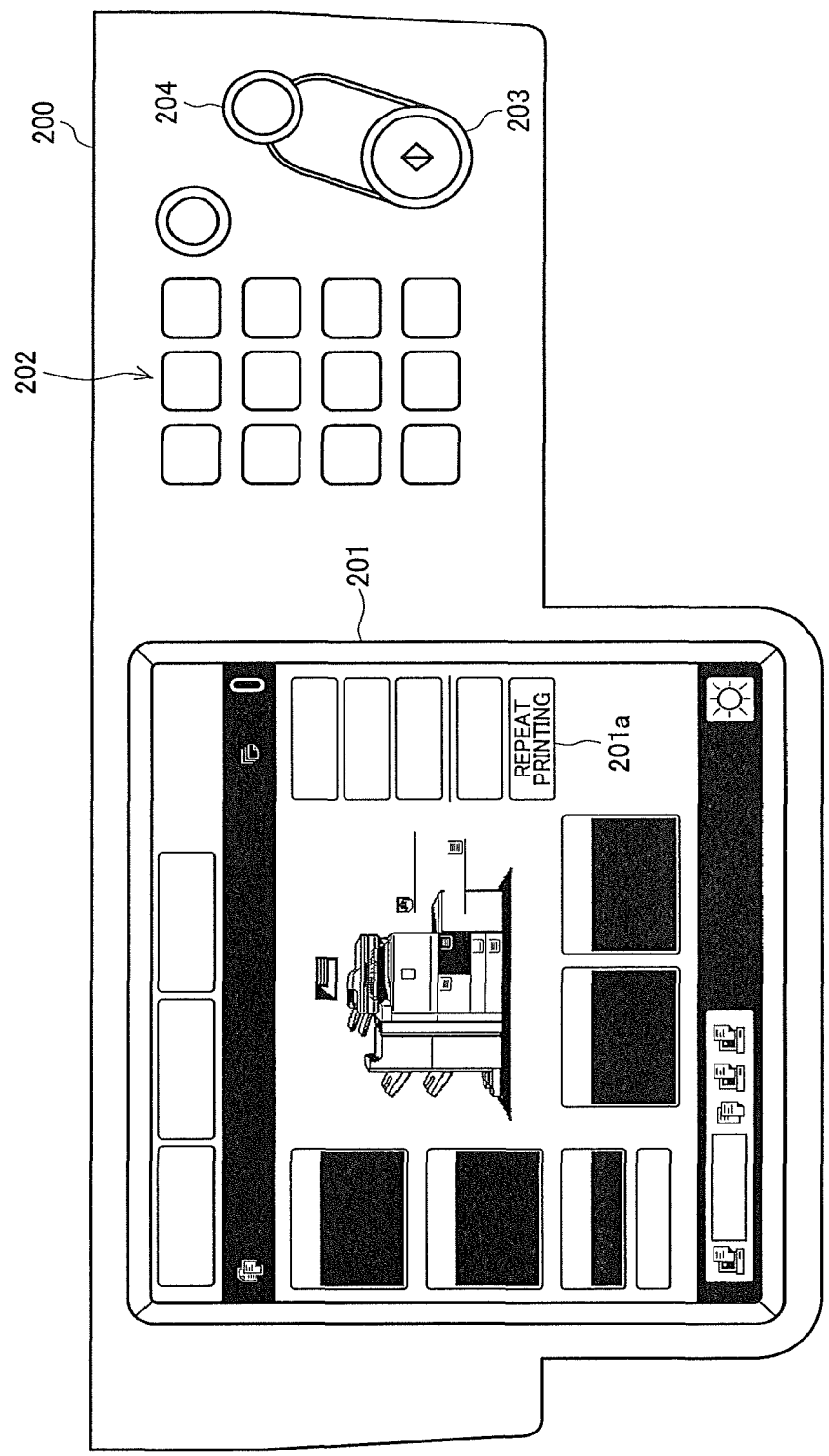
FIG. 7 is a diagram showing a display example of a display portion/operating portion of the image forming apparatus according to the present invention.

FIG. 7 is a diagram showing a display example of a display portion/operating portion of the image forming apparatus according to the present invention. Description will be given here with reference to also the configuration of FIG. 1. The image forming apparatus as described above indicates various information as well as includes the display portion/operating portion 17 which receives operation input by a user. In this example, the display portion/operating portion 17 is composed of an operation panel 200 including a touch panel 201, a numeric keypad input portion 202, a start key 203 and a color setting key 204. The touch panel 201 in which a message or keys are displayed on a liquid crystal screen thereof enables a user to perform operation input for different parts by directly touching a key, etc.

Here, in the touch panel 201, a repeat printing key 201a for performing repeat printing is set. The user is able to switch the image forming apparatus into the repeat printing mode by pressing the repeat printing key 201a. Then, a document which is desired to be printed with repeat printing is placed on a document platen of the image forming apparatus and the start key 203 is pressed, whereby reading of the document image by the image reading portion 15 is started. Alternatively, after having switched into the repeat printing mode, image data for the repeat printing may be read out from an external device or an operation may be performed for reading out image data from an internal memory in which image data input from the external device is temporarily stored.

Figure 8:
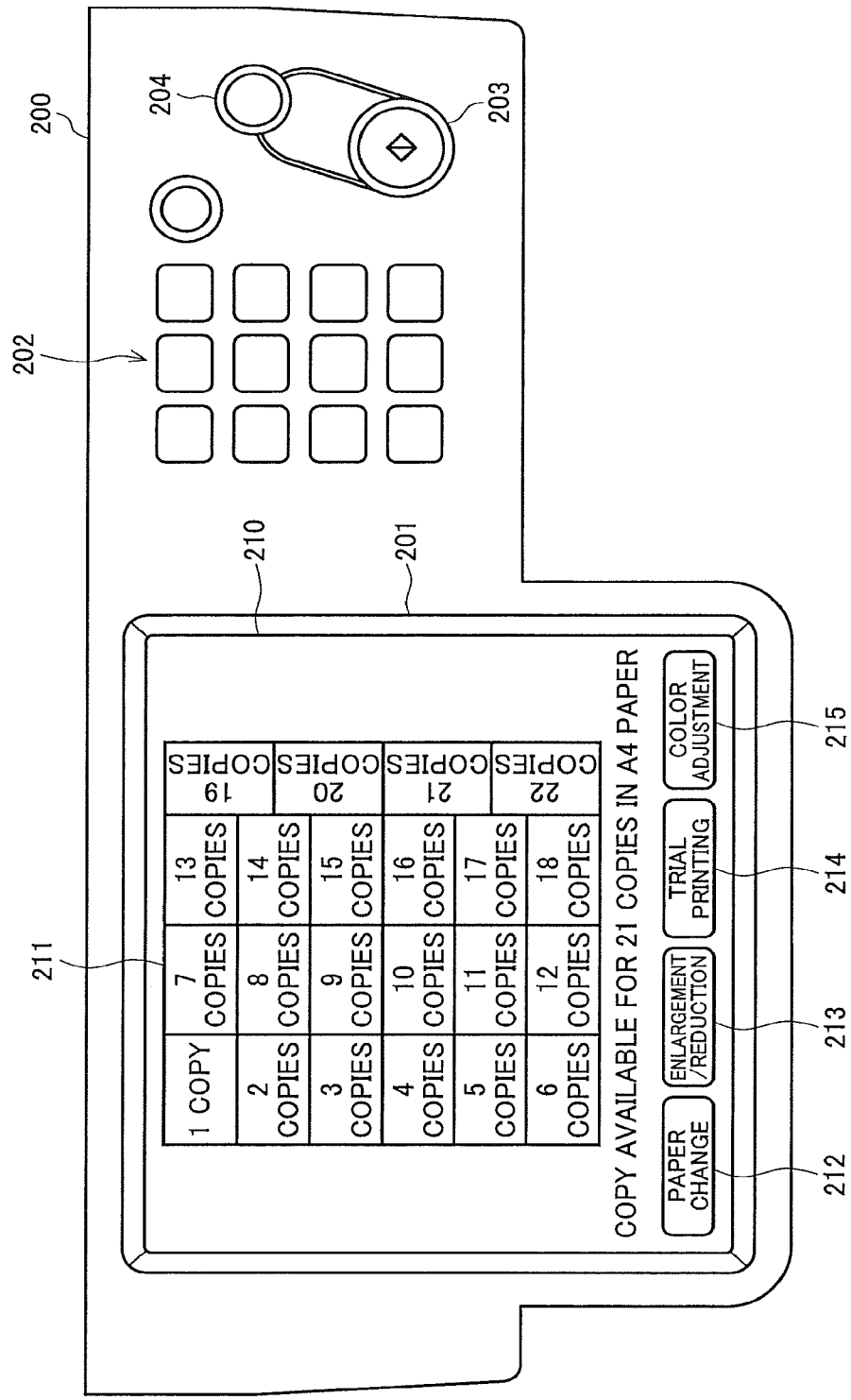
FIG. 8 is another diagram showing a display example of a display portion/operating portion of the image forming apparatus according to the present invention.

When the image data of the document is read by pressing the start key 203 in FIG. 7, a layout screen 210 as shown in FIG. 8 is displayed in the touch panel 201. The layout processing portion 14 of the image forming apparatus determines a layout of repeat printing based on image data of a document image and size of recording paper selected as print conditions, and prepares a layout screen 210 by the processing of the image changing portion 13 so as to be displayed on the operation panel 200. In this example, a layout 211 is set so that 22 copies of the document images are repeatedly arranged and printed on the recording paper.

Further, on the layout screen 210, a paper change key 212, an enlargement/reduction key 213, a trial printing key 214, a color adjustment key 215 are displayed. The paper change key 212 is a key for performing setting change of recording paper and which enables a user to change the size of the recording paper by pressing the paper change key 212. When the size of the recording paper is changed, the layout is changed by the layout processing portion 14 corresponding to the recording paper and a layout 211 after changing is prepared in the image changing portion 13 to be displayed on the touch panel 201.

Furthermore, operation of the enlargement/reduction key 213 enables enlargement or reduction of a document image. Even in a case where enlargement/reduction of a document image is performed, the layout is changed as necessary.

A trial printing key 214 is operated when a user wants to check a finished state using the trial printing in performing repeat printing by means of the layout 211. The trial printing is set by pressing the trial printing key 214, and the trial printing is executed according to the set layout 211 by pressing the start key 203.

When the trial printing is executed, the user checks a finished state thereof and, when the finished state is satisfiable inputs a necessary number of images (copies) with use of the numeric keypad input portion 202 and presses the start key 203. At this time, the recording paper on which the trial printing is performed is set in the paper feed portion 19 again by the time the start key 203 is pressed. Thereby repeat printing is executed, and at this time, the number of images to be printed by the repeat printing is the number which is set by the numeric keypad input portion 202. That is, in accordance with the set layout 211, an image is printed by means of repeat printing in sequence from a position of an image of the first copy and the printing is executed to the image of the set number. When printing of a set scheduled quantity of printing is finished, the recording paper is discharged.

At this time, means for detecting an indication showing a direction at an edge portion of the recording paper (for example, triangular marks shown in FIG. 4) may be provided to check whether or not the recording paper is the one on which the trial printing is performed at the time of executing repeat printing. When the recording paper is confirmed to be the one on which the trial printing is performed, a predetermined number of copies of an image by repeat printing are printed on a remaining layout position excluding the trial printing image based on the number of times of the trial printing stored in the layout processing portion 14 and position information of an image for which trial printing is performed. With such a configuration, it is possible to prevent an error in a setting direction of the recording paper in feeding the paper again. Furthermore, in the image forming apparatus 1, a position of the image for which the trial printing is performed is stored, and thus there is no need to detect a blank space.

According to the present invention, it is possible to provide an image forming apparatus having a repeat printing function for forming images by arranging a plurality of image data to be printed on one sheet of recording paper, in which at a stage of printing only one image on one sheet of recording paper, a user checks a finished state thereof, and a scheduled quantity of repeat printing is performed so that recording paper, a toner and the like for performing printing is saved, thus enabling realization of the resource saving.

The invention claimed is:

1. An image forming apparatus, comprising:
an image forming portion which forms an image of image data on recording paper;
a paper feed portion which feeds the recording paper to the image forming portion;
a carrying-out portion which makes the image forming portion carry out a first printing function which forms images by repeatedly arranging the image data on one sheet of recording paper, and a second printing function which, when forming a plurality of images for the image data, forms one image for the image data, and subsequently, forms the image again in response to input of an image formation instruction;
an image changing portion which changes at least one of a size and a color of image data that is output from one of an image reading portion and a data input portion; and
a layout processing portion which sets, according to a paper size which is set by a user, a layout of the image data having been changed by the image changing portion, wherein
the image forming portion enables execution of the second printing function in a mode of executing the first printing function, and in forming the image by the second printing function, forms one image on a part of recording paper for the image data to be printed by means of repeat printing, and in response to input of an instruction of printing by the first printing function, feeds the recording paper on which the image is formed by the second printing function again by the paper feed portion and forms the image according to a layout set by the layout processing portion in a blank space on the fed recording paper.

2. The image forming apparatus as defined in claim 1, wherein the image forming portion enables repetitive execution of forming the image more than once by the second printing function, and when forming the image by the second printing function, forms a next image by the second printing function at a position of a blank on the recording paper excluding a position of an image formed by the second printing function in the past.

3. The image forming apparatus as defined in claim 2, wherein the image forming portion forms the image according to the layout set by the layout processing portion by the first printing function at the position of the blank on the recording paper excluding a position of the image formed by the second printing function, when forming the image according to a layout set by the layout processing portion by the first printing function after forming the image is repeated more than once by the second printing function.

4. The image forming apparatus as defined in claim 2, wherein the image forming portion attaches, to another image excluding the image to which a print condition used for forming images by the first printing function is set among the plurality of images formed by the second printing function, an indication for clearly showing that the image is not used for the repeat printing, when forming the image according to the layout set by the layout processing portion by the first printing function after forming the image is repeated more than once by the second printing function.

5. The image forming apparatus as defined in claim 2, wherein the image changing portion stores print conditions of the plurality of images formed by the second printing function performed more than once, and the image forming portion forms an image which is selected by the user among the plurality of images, according to the layout set by the layout processing portion by the first printing function with use of the print condition stored in the image changing portion.

6. The image forming apparatus as defined in claim 1, wherein the image forming portion attaches, to a predetermined position of the recording paper, an indication showing a setting direction of the recording paper to the paper feed portion again, when forming the image by the second printing function.

* * * * *